US011117082B2

(12) United States Patent
Neef et al.

(10) Patent No.: US 11,117,082 B2
(45) Date of Patent: Sep. 14, 2021

(54) FILTER DEVICE AND ROUND FILTER ELEMENT, IN PARTICULAR FOR GAS FILTRATION

(71) Applicant: MANN+HUMMEL GmbH, Ludwigsburg (DE)

(72) Inventors: Pascal Neef, Leonberg (DE); Nadine Donauer, Fellbach (DE); Fabian Wagner, Moeglingen (DE); Torsten Fritzsching, Vaihingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 218 days.

(21) Appl. No.: 16/386,384

(22) Filed: Apr. 17, 2019

(65) Prior Publication Data

US 2019/0308123 A1 Oct. 10, 2019

Related U.S. Application Data

(63) Continuation of application No. PCT/EP2017/072836, filed on Sep. 12, 2017.

(30) Foreign Application Priority Data

Oct. 17, 2016 (DE) .......................... 102016012325.7

(51) Int. Cl.
*B01D 46/24* (2006.01)
*B01D 46/00* (2006.01)
*F02M 35/024* (2006.01)

(52) U.S. Cl.
CPC ...... *B01D 46/2411* (2013.01); *B01D 46/0002* (2013.01); *B01D 46/0041* (2013.01);
(Continued)

(58) Field of Classification Search
CPC ............ B01D 46/2411; B01D 46/2414; B01D 46/0002; B01D 46/0041; B01D 46/0045;
(Continued)

(56) References Cited

U.S. PATENT DOCUMENTS 5,916,435 A * 6/1999 Spearman .............. B01D 29/23
210/132
2005/0120686 A1 6/2005 Nakagome et al.
(Continued)

FOREIGN PATENT DOCUMENTS

AU 200227476 A1 9/2003
DE 102004053118 A1 6/2005
(Continued)

*Primary Examiner* — Robert Clemente
(74) *Attorney, Agent, or Firm* — James Hasselbeck (57) ABSTRACT

A filter device has a filter housing and a round filter element received in the interior of the filter housing. The round filter element has a filter medium body with a wall flowed through radially relative to a longitudinal axis of the filter medium body by a fluid to be purified. The round filter element has a first end disk and a second end disk arranged at opposed end faces of the filter medium body. The filter medium body has an inwardly positioned flow space inside the filter medium body that is the raw side of the round filter element. A support grid is arranged externally at the wall of the filter medium body. The filter housing has a housing cover with a flow guiding rib arranged at an inner side of the housing cover facing the interior. The flow guiding rib projects into the inwardly positioned flow space.

15 Claims, 6 Drawing Sheets

(52) U.S. Cl.
CPC ..... *B01D 46/0045* (2013.01); *B01D 46/2414* (2013.01); *F02M 35/02483* (2013.01); *B01D 2201/0415* (2013.01); *B01D 2201/0423* (2013.01); *B01D 2271/022* (2013.01); *B01D 2275/201* (2013.01); *B01D 2275/208* (2013.01)

(58) Field of Classification Search
CPC ........ B01D 2271/022; B01D 2271/027; B01D 2275/201; B01D 2275/208; B01D 2201/0415; B01D 2201/0423; B01D 2265/06; F02M 35/02483
See application file for complete search history.

(56) References Cited

U.S. PATENT DOCUMENTS

| | | | | |
|---|---|---|---|---|
| 2006/0107638 A1* | 5/2006 | Holzmann | ......... | B01D 46/0005 55/498 |
| 2007/0186526 A1* | 8/2007 | Lane | ................. | B01D 46/0031 55/486 |
| 2007/0209341 A1* | 9/2007 | Pearson | ............ | B01D 46/0045 55/418 |
| 2007/0271884 A1* | 11/2007 | Pearson | ............. | B01D 46/0031 55/410 |
| 2010/0154371 A1* | 6/2010 | Bittle | ................. | B01D 46/2411 55/502 |
| 2010/0154372 A1* | 6/2010 | Bittle | ................. | B01D 46/2411 55/504 |
| 2016/0131094 A1 | 5/2016 | Pereira Madeira et al. | | |

FOREIGN PATENT DOCUMENTS

| | | |
|---|---|---|
| EP | 0793525 B1 | 9/1997 |
| EP | 0900115 B1 | 3/1999 |
| EP | 1087829 A1 | 12/1999 |
| EP | 1621757 A1 | 2/2006 |
| EP | 2213360 B1 | 8/2010 |
| FR | 1563990 A | 4/1969 |
| WO | 2004009210 A1 | 1/2004 |
| WO | 2006013330 A1 | 2/2006 |
| WO | 2009012010 A1 | 1/2009 |
| WO | 2009106589 A1 | 9/2009 |
| WO | 2012110605 A1 | 8/2012 |
| WO | 2014202450 A1 | 12/2014 |

* cited by examiner

FILTER DEVICE AND ROUND FILTER ELEMENT, IN PARTICULAR FOR GAS FILTRATION

CROSS-REFERENCE TO RELATED APPLICATIONS

This application is a continuation application of international application no. PCT/EP2017/072836 having an international filing date of 12 Sep. 2017 and designating the United States, the international application claiming a priority date of 17 Oct. 2016 based on prior filed German patent application no. 102016012325.7, the entire contents of the aforesaid international application and the aforesaid German patent application being incorporated herein by reference.

BACKGROUND OF THE INVENTION

The invention concerns a filter device and a round filter element, in particular for gas filtration, for example, air filter, with a round filter element and with a filter housing for receiving the round filter element, wherein the round filter element comprises a filter medium body, whose wall can be flowed through in radial direction relative to the longitudinal axis of the filter medium body by the fluid to be purified, with an end disk at oppositely positioned end faces of the filter medium body, respectively, wherein the raw side is located in an inwardly positioned flow space inside the filter medium body and a support grid is arranged at the outer wall of the filter medium body.

DE 10 2004 053 118 A1 discloses an air filter device for an internal combustion engine that comprises a hollow cylindrical filter element in a filter housing, wherein the filter element is flowed through by the air to be purified in radial direction from the interior to the exterior. The air is guided through an open axial end face into the interior of a filter medium body of the filter element and flows through the wall of the filter medium body in radial direction from the interior to the exterior. Subsequently, the purified air is discharged through an outlet socket from the air filter device.

The filter element is placed onto an inlet socket which is located at the bottom of the filter housing and projects into the interior of the filter element in the mounted state. The incoming air flows through the inlet socket axially into the interior of the filter element and is subsequently deflected in radial direction for flow through the filter medium body.

SUMMARY OF THE INVENTION

The invention has the object to embody a filter device and a round filter element, that comprises an inwardly positioned flow space and is flowed through by the fluid to be purified in radial direction from the interior to the exterior, with simple constructive measures in such a way that a high filtration efficiency is ensured over a long operating period.

This object is solved according to the invention in that the filter housing comprises a housing cover that at an inner side comprises a flow guiding rib which projects into the inwardly positioned flow space of the round filter element.

The dependent claims provide expedient further developments.

The filter device according to the invention comprises a round filter element and a filter housing for receiving the round filter element. The round filter element comprises a filter medium body whose wall can be flowed through by the fluid to be purified in radial direction relative to the longitudinal axis of the filter medium body; moreover, an end disk at opposite end faces of the filter medium body, respectively. The raw side is located in the inwardly positioned flow space inside the filter medium body and a support grid is arranged at the outer wall of the filter medium body. The filter housing comprises a housing cover that, at its inner side, comprises a flow guiding rib which projects into the inwardly positioned flow space of the round filter element.

The filter housing includes a housing cover which can be attached to the filter housing base in order to close off the receiving space inside the filter housing base in which the filter element is inserted. Accordingly, at the inner side of the housing cover, a preferably blade-shaped flow guiding rib is arranged which aids in introducing the fluid flow into the inwardly positioned flow space and in uniform particle loading of the filter element during filtration of the fluid, in particular also for non-symmetrical or non-parallel flow conditions. The unpurified fluid is preferably guided from the exterior in radial direction toward the filter medium body and impacts then on the flow guiding rib at the inner side of the housing cover that influences the impacting fluid flow, for example, divides it into two and/or guides it in the direction toward the inwardly positioned flow space of the filter medium body.

The round filter element can be designed such that it has an open end disk that comprises a flow opening through which the flow guiding rib projects wherein by means of or through the flow opening the unpurified fluid is introduced into the inwardly positioned flow space inside the filter medium body.

The filter medium body is preferably configured to be flowed through in radial direction from the interior to the exterior.

According to a further preferred embodiment, a lateral flow opening is provided in the housing cover which is preferably embodied as an inflow opening and, particularly preferred, corresponds with a further inflow opening which is provided in the filter housing base in such a way that, when the housing cover is attached, the inflow openings are lying on top of each other.

In particular, the flow guiding rib can have a curvature, preferably such that a fluid flow that is radially supplied through the inflow opening of the housing cover is subjected to a deflection by the flow guiding rib in the direction toward the inwardly positioned flow space of the filter medium body.

According to this embodiment, a lateral inflow opening for the fluid to be supplied is advantageously provided also in the filter housing base of the filter housing wherein this inflow opening in the filter housing base and the lateral inflow opening in the housing cover are lying on top of each other in the mounted state and form a continuous flow path for the incoming fluid.

However, different embodiments of the flow guiding rib are conceivable. The flow guiding rib is embodied either to be straight and positioned in a plane or, according to an alternative embodiment, curved. In case of a straight configuration, the flow guiding rib can extend in axial direction of the filter element so that the wall faces of the flow guiding rib extend parallel to the longitudinal axis of the filter element.

Alternatively or additionally, it can be provided that an end face of the flow guiding rib is facing the flow opening in the housing cover. The flow guiding rib can be arranged in particular adjacent to the inflow opening in the housing cover, i.e., can be positioned in such a way that the end face of the flow guiding rib is facing the inflow opening in the housing cover.

The fluid flow which is radially supplied through the housing cover impinges on the flow guiding rib and experiences a deflection in the direction toward the inwardly positioned flow space inside the filter medium body. Moreover, the flow guiding rib and the inflow opening can be arranged at least approximately parallel.

According to a further expedient embodiment, the filter housing base is provided with a lateral outflow opening that is preferably pointing in radial direction and through which the purified fluid can flow out. It can be expedient that the outflow opening is at least approximately parallel to the inflow opening as well as to the flow guiding rib.

According to a further expedient embodiment, the filter element in the mounted state projects axially slightly past the end face of the filter housing base so that removal of the filter element from the filter housing base, for example, for servicing purposes, is facilitated. The seal carrier with the sealing element is positioned at a small axial spacing relative to the protruding end face of the filter element and provides for a flow-tight separation between the externally positioned section of the filter element and the inwardly positioned section of the filter element received in the filter housing base.

The round filter element according to the invention is preferably used for gas filtration, for example, for filtration of air, in particular in the intake manifold of an internal combustion engine of a vehicle. The filter element comprises an annularly closed filter medium body whose wall is flowed through by the fluid to be purified in radial direction. The filter medium body surrounds an inwardly positioned flow space that is delimited by the inner wall of the filter medium body, wherein the inner wall forms the raw side. The fluid to be purified is guided axially into the inwardly positioned flow space and flows through the wall of the filter medium body in radial direction relative to its longitudinal axis. The outer side of the filter medium body forms the clean side through which the purified fluid exits from the wall of the filter medium body. The axial end faces of the filter medium body are covered by end disks in a flow-tight manner. For axial flow conveyance of the fluid, one end disk comprises a central opening that is communicating with the inwardly positioned flow space; however, the oppositely positioned end disk is embodied in a closed configuration and closes off the inwardly positioned flow space outwardly in axial direction.

Expediently, the end disk of the filter element that is provided with the central opening is rounded at its radial inner side whereby the inflow of the raw air into the interior in the filter medium body is facilitated. This is of particular importance in connection with the inflow into the interior of the filter element for minimizing the total pressure loss when, as preferred in the present case, the air flows freely into the interior and, as further preferred in the present case, no flow pipe is provided that guides the air stream directly into the interior. The radius of the rounded portion at the radial inner side of the end disk is advantageously larger than at the radial outer side. The radius at the radial inner side is embodied, as needed, so large that the starting point of the radius at the end face is still within the contour of the filter medium body. The radius of the rounded portion at the radial inner side of the end disk is, for example, in a range between 5 mm and 15 mm, for example, is 7.5 mm.

The round filter element and the filter medium body can be designed to be hollow cylindrical so that the inwardly positioned flow space is cylindrical. Moreover, embodiments are possible in which the round filter element and the filter medium body are elongate and have an oval or ovalized cross section shape. In case of elongate cross section shapes, cross section shapes with parallel long sides and semicircular narrow sides are possible. Moreover, concave or convex long sides with radially inwardly oriented bulges or radially outwardly oriented bulges are conceivable. Preferably, the inner wall and the outer wall of the filter medium body extend concentrically to each other so that the filter medium body has a constant radial thickness.

According to a further expedient embodiment, the round filter element has a cross section shape that tapers in axial direction so that the outer circumference of the round filter element in the region of the first end disk is of a different size in comparison to the outer circumference of the round filter element in the region of the oppositely positioned second end disk. In this embodiment, round cross section shapes in the region of both end disks are also conceivable so that the round filter element and the filter medium body are embodied in a conical shape. Moreover, it is possible to provide in the region of both end disks an oval or ovalized cross section shape, respectively.

In case of a tapering cross section shape of the round filter element, the end disk at the end face with the smaller outer circumference can be designed to be closed and to close off axially the inwardly positioned flow space, while the oppositely positioned end disk at the larger outer circumference comprises a flow opening for introducing fluid into the inwardly positioned flow space.

Moreover, embodiments are possible in which the end disk at the end face with the larger outer circumference is embodied to be closed and closes off axially the inwardly positioned flow space and the oppositely positioned end disk at the smaller outer circumference comprises a flow opening for introducing fluid into the inwardly positioned flow space.

The round filter element according to the invention comprises at the outer wall of the filter medium body a support grid that is in particular designed to be shape-stable. The support grid is, for example, embodied as a thermoplastic injection-molded part. Due to the flow through the filter medium body in radial direction from the interior to the exterior, the wall of the filter medium body is subjected to a radial outwardly oriented pressure under which the wall has the tendency to curve outwardly. The support grid at the outer wall of the filter medium body prevents a deformation of the wall in radial direction outwardly and thus maintains the shape of the filter medium body during filtration so that a deformation is avoided. Correspondingly, the filter medium body maintains over a long operating period its original geometric shape and the flow conditions during filtration of the fluid are maintained. Also, the filter medium body experiences at the outer side a support action by the support grid so that the filter medium body is subjected to reduced loads and the risk of damage of the filter medium body is reduced. Advantageously, at least one end face of the support grid, as needed, both end faces are embedded in the end disks. At least one end disk is comprised preferably of a softer material than the support grid and a seal carrier at the filter element which receives a sealing element. Preferably, the end disk or the end disks are produced of a pourable material such as, as an example and preferred, polyurethane (PUR), in particular polyurethane foam.

The filter medium body is preferably configured as a folded filter with a plurality of filter folds. The filter folds extend preferably in or approximately in radial direction and thus in the flow direction and extend at the same time axially between the two end faces of the filter medium body. The folded filter is of an annularly closed configuration.

In particular, precisely one filter medium body embodied as a round filter is arranged in the filter element.

According to a further advantageous embodiment, a shaped body is projecting into one end face of the filter medium body and stabilizes additionally the filter medium body and secures the filter folds in the desired position in the embodiment as a folded filter. In the embodiment with a tapering cross section surface, the shaped body is preferably located at the end face with reduced cross section surface. The shaped body can be embodied as one piece together with the support grid at the filter medium body so that supporting forces, acting on the end face of the filter element with the shaped body, are distributed through the shaped body to the support grid and the end disk is relieved of the supporting forces.

The outer contour of the shaped body corresponds advantageously to the outer contour and/or the inner contour of the filter medium body at its end face into which the shaped body is projecting into the filter medium body. It can be expedient to connect the shaped body at least over sections thereof to the neighboring end disk, for example, to form a support sleeve on the shaped body that is projecting into the end disk. The end disk into which one or a plurality of sections of the shaped body are projecting is preferably of a closed configuration and flow-tightly seals the interior in the filter medium body. The shaped body can taper as needed toward its free end face in a wedge shape whereby the manufacturing process of the filter element is simplified and supported. The shaped body is in particular embodied as an elongate body and extends between opposite sides of the support grid.

According to an advantageous embodiment, the round filter element comprises a sealing element, in particular a circumferentially extending sealing ring that is arranged on a seal carrier embodied separate from the end disk and arranged adjacent to the end disk at the raw side through which the unpurified fluid is introduced into the inwardly positioned flow space. In this context, the sealing element is positioned axially and radially at a spacing relative to the neighboring nearest end disk. Through the sealing element, a flow-tight separation of the raw side from the clean side is realized. Due to the configuration of the seal carrier separate from the end disk, the end disk is not subjected to holding and sealing forces that are absorbed by the sealing element and the seal carrier in the installation situation of the round filter element. The end disk remains thus unaffected by the holding and sealing forces. Due to the spacing of the sealing element and advantageously also of the seal carrier in axial and radial directions relative to the neighboring end disk, seal carrier and sealing element also have a spacing relative to the clean side or exterior side of the filter medium body so that the fluid can exit via the clean side of the filter medium, unhindered by the seal carrier and by the sealing element. The seal carrier is fluid-tightly embodied and connects advantageously the nearest end disk fluid-tightly with the sealing element.

The seal carrier is axially spaced apart relative to the end face of the neighboring nearest end disk. Relative to the total axial height of the filter element, the axial spacing amounts to, for example, maximally 30% of the axial height, preferably maximally 20% of the axial height, or maximally 10% of the axial height.

According to a preferred embodiment, the seal carrier is arranged at the support grid. In particular, a one-piece configuration of support grid and seal carrier is conceivable, which are preferably embodied as plastic components. The sealing and holding as well as supporting forces are absorbed correspondingly by the seal carrier and the support grid while the filter medium body is relieved of these forces.

According to a further advantageous embodiment, the seal carrier is configured as a circumferentially extending carrier wall which is extending at a spacing to the outwardly positioned wall surface of the filter medium body. The carrier wall extends in particular parallel to the outwardly positioned wall surface of the filter medium body. The sealing element is advantageously inserted into a receiving groove in the carrier wall, wherein the receiving groove is preferably located at or adjacent to an end face of the carrier wall. The position of the sealing element at the carrier wall is located at the end face of the carrier wall which is facing away from the nearest end disk.

In a preferred embodiment, the seal carrier or the carrier wall, in particular at the end face of the seal carrier or carrier wall facing away from the sealing element, is connected seal-tightly and preferably with form fit to the end disk nearest the sealing element, i.e., the open end disk, in particular is embedded therein or glued thereto. In cases in which seal carrier and support grid are formed as one piece, the unit of seal carrier and support grid can advantageously be connected respectively in such a way to both end disks, preferably respectively by embedding the respective end face ends in the respective end disk, so that the end face ends of seal carrier and support grid are embedded with form fit in the end disks.

In the mounted position, the seal carrier is supported advantageously at a housing component, for example, at an inwardly positioned shoulder in a filter housing base that receives the filter element and to which a housing cover can be attached.

At the end face, in particular at the top side of the seal carrier, knobs can be integrally formed, as needed, advantageously with axial spacing relative to the end face. These knobs have the function of a tolerance compensation and can compensate deviations of the seal carrier relative to a plane surface for attaching the housing cover and/or placing onto the shoulder in the filter housing base. The knobs are, for example, rod-shaped and are positioned parallel to the sidewall of the seal carrier; the rod-shaped knobs extend, for example, in radial direction. In the installed position, the knobs are pressed into the material of the housing component and/or the knobs are in particular elastically or plastically deformed and compensate thereby tolerance deviations. Preferably, a softer material is selected for the knobs than for the housing component (in particular the housing cover) so that the deformation is substantially or completely realized by the knobs.

According to a further embodiment that relates in particular to a round filter element with a cross section shape that tapers in axial direction, the smaller end disk comprises radially projecting support cams. Advantageously, the support cams project in radial direction no farther than the oppositely positioned end disk or the inner contour or outer contour of the oppositely positioned seal. However, a slight protrusion may be provided in order to achieve a particularly strong clamping action. The inner contour of seal carrier and/or sealing element extends advantageously in radial direction substantially along the outer circumference of the larger end disk.

In case of an oval or ovalized cross section shape of the filter medium body, the support cams are preferably located at the long sides and are in particular arranged at the end disk, preferably at the smaller end disk, in particular embodied as one piece together with the end disk and integrally formed thereat. However, it is also possible to arrange additionally at the narrow side one or several cams at the end disk. The cams project in radial direction past the end disk and support preferably the round filter element at the receiving filter housing in the installed state.

BRIEF DESCRIPTION OF THE DRAWINGS

Further advantages and expedient embodiments can be taken from the further claims, the figure description, and the drawings.

In the Figures, same components are provided with same reference characters.

DESCRIPTION OF PREFERRED EMBODIMENTS

In FIGS. 1, 2, 6, and 7, a filter device 1 is illustrated that preferably is utilized for gas filtration, in particular for air filtration in the intake manifold of an internal combustion engine. The filter device 1 comprises a filter housing 2 that is comprised of a filter housing base 3 and a housing cover 4, and a filter element 5 that is insertable into the filter housing base 3. The housing cover 4 closes off the receiving space inside the filter housing base for receiving the filter element 5.

Figure 1:
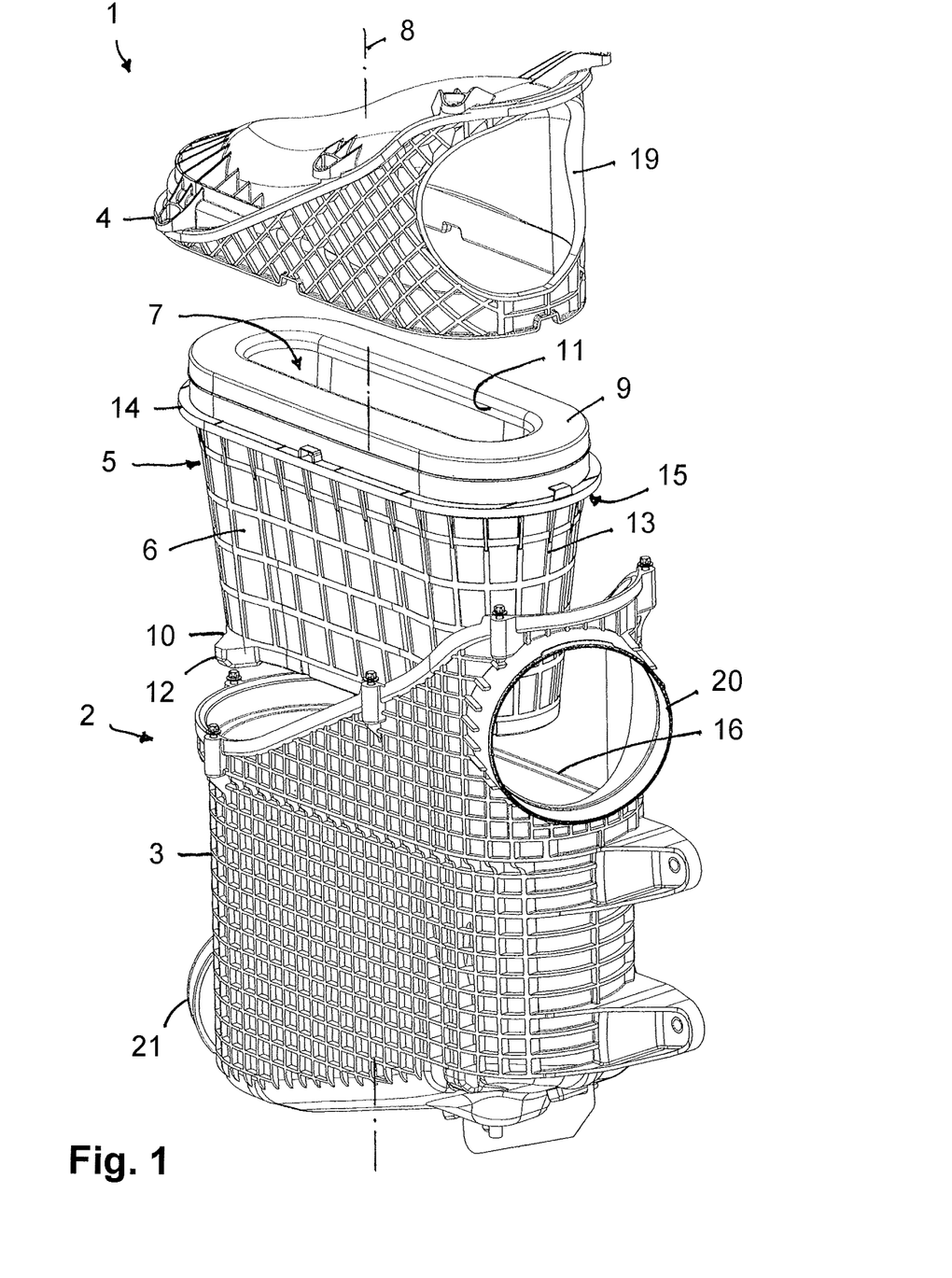
FIG. 1 shows in exploded illustration a filter device for gas filtration, with a filter housing base, a filter element, and a housing cover.
Figure 3:
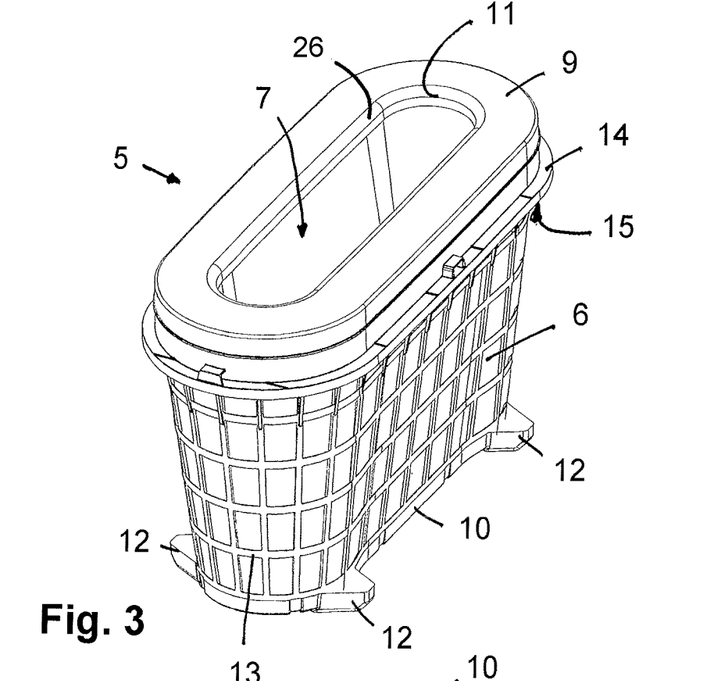
FIG. 3 shows a perspective view of the filter element from above.
Figure 4:
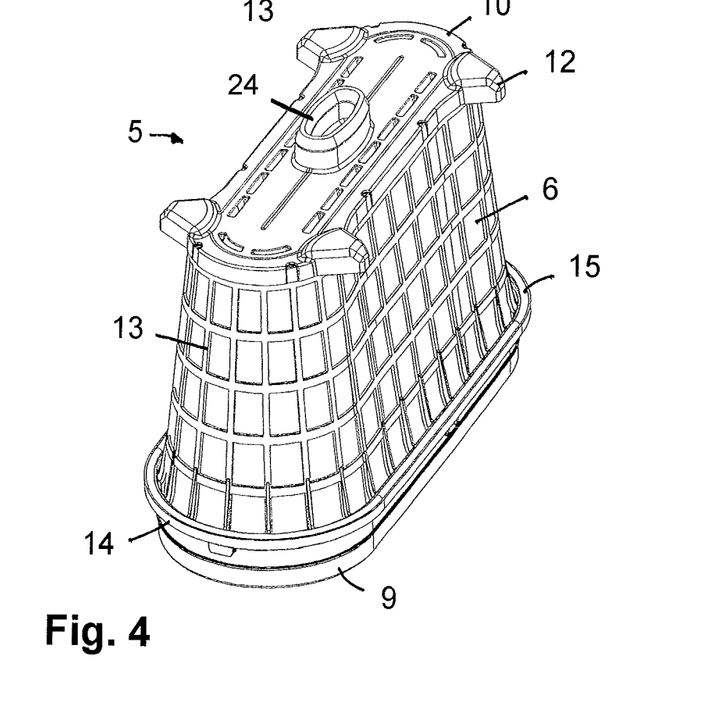
FIG. 4 is a perspective view of the filter element from below.

The filter element 5, as can be seen in FIGS. 1, 3, and 4, is provided with a filter medium body 6 where the filtration of the fluid to be purified is taking place. The filter element 5 is configured as a round filter element; correspondingly, the filter medium body 6 is also embodied as a round element that surrounds an inwardly positioned flow space 7 into which the fluid to be purified is introduced. The fluid is introduced axially, relative to the longitudinal axis 8 of the filter element 5 and of the filter device 1 (FIG. 1), into the flow space 7. Subsequently, the fluid flows through the wall of the filter medium body 6 in radial direction from the interior to the exterior. Accordingly, the inner wall of the filter medium body 6 is the raw side and the outer wall is the clean side.

The filter element 5 and the filter medium body 6 comprise a strongly ovalized shape with two parallel extending long sides and semicircular narrow sides. Also, the filter element 5 has a conical basic shape where the axially oppositely positioned end faces of the filter element 5 are of a different size and have an outer circumference of a different size. The axial end faces of the filter medium body 6 are fluid-tightly covered by a respective end disk 9, 10, wherein the end disk 9 at the larger end face of the filter element 5 is embodied to be open and comprises a flow opening 11 through which the raw fluid can flow into the inwardly positioned flow space 7. The oppositely positioned end disk 10, on the other hand, is embodied to be closed, as can be seen in FIG. 4, so that the inwardly positioned flow space 7 is also axially closed at this side.

At the closed end disk 10, cams 12 are integrally formed which extend radially in outward direction and are positioned at the long sides adjacent to the narrow sides. The cams 12 which are formed as one piece together with the end disk 10 support the filter element 5 at the filter housing base 3 in the mounted state. In radial direction, the cams 12, in particular in the mounted state, preferably do not project farther than the oppositely positioned larger end disk 9.

At the outer wall of the filter medium body 6, there is a support grid 13 which is in particular made of plastic material and is embodied separate from the end disks 9 and 10. The support grid 13 supports the filter medium body at its outer wall in radial direction. Due to the radial flow through the filter medium body 6 from the interior to the exterior, a pressure oriented outwardly is produced in the filter medium body which is absorbed by the support grid 13. This ensures that the filter medium body 6 is not deformed by the pressure of the fluid flowing through it.

Adjacent to the end disk 9 provided with the flow opening 11 for introducing the raw fluid, there is a seal carrier 14 that carries a sealing element 15. The seal carrier 14 is designed as a circumferentially extending carrier wall which is positioned in a plane orthogonal to the longitudinal axis 8 and is preferably embodied as one piece together with the support grid 13. The seal carrier 14 is arranged at a minimal axial spacing relative to the top end disk 9 and at a significantly greater axial spacing relative to the bottom end disk 10. The outer circumference of the seal carrier 14 has a greater radial extension than the outer wall of the filter medium body 6.

The sealing element 15 is designed as a sealing ring that is preferably inserted into a receiving groove in the end face of the carrier wall 14 at the side which is facing away from the neighboring end disk 9. The sealing element 15 is facing away from the nearest end disk 9 and is facing the oppositely positioned end disk 10 and, in the mounted state, is resting on a circumferential shoulder 16 (FIG. 1) at the inner wall of the receiving filter housing base 3. The shoulder 16 is positioned axially at a spacing relative to the upper end face edge of the filter housing base 3.

Figure 5:
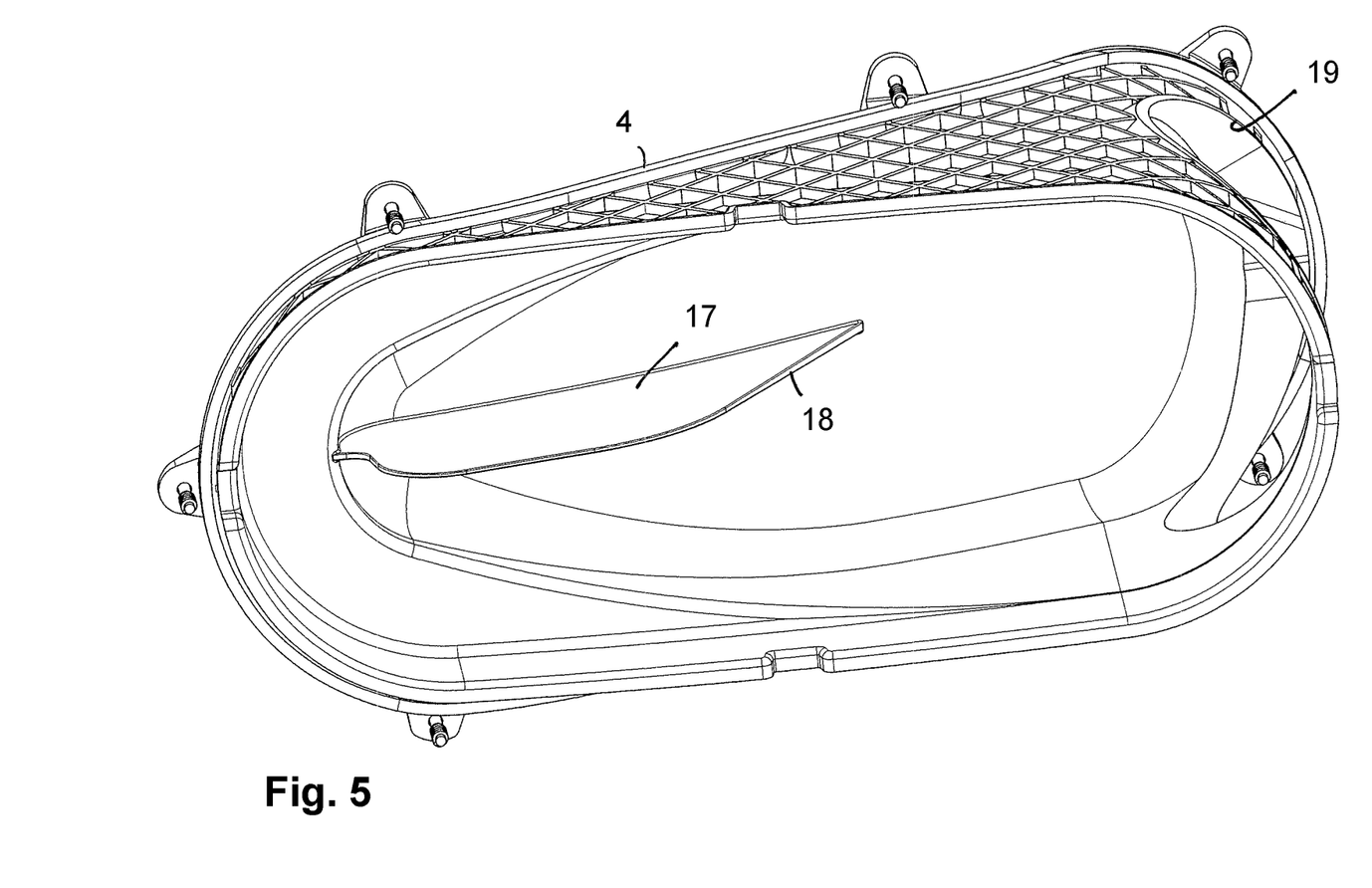
FIG. 5 is an interior view of the housing cover, with a flow guiding rib at the inner side of the housing cover.
Figure 6:
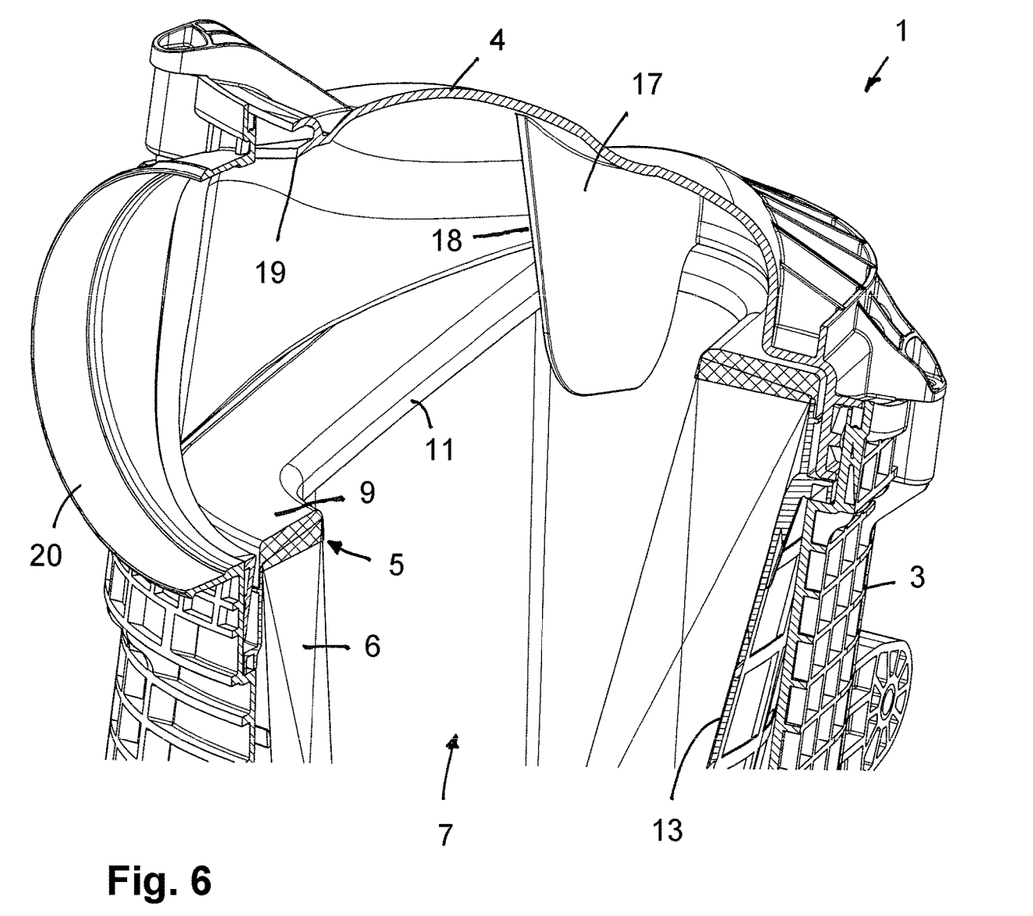
FIG. 6 shows in perspective view a section view of the filter device in the region of the housing cover.
Figure 7:
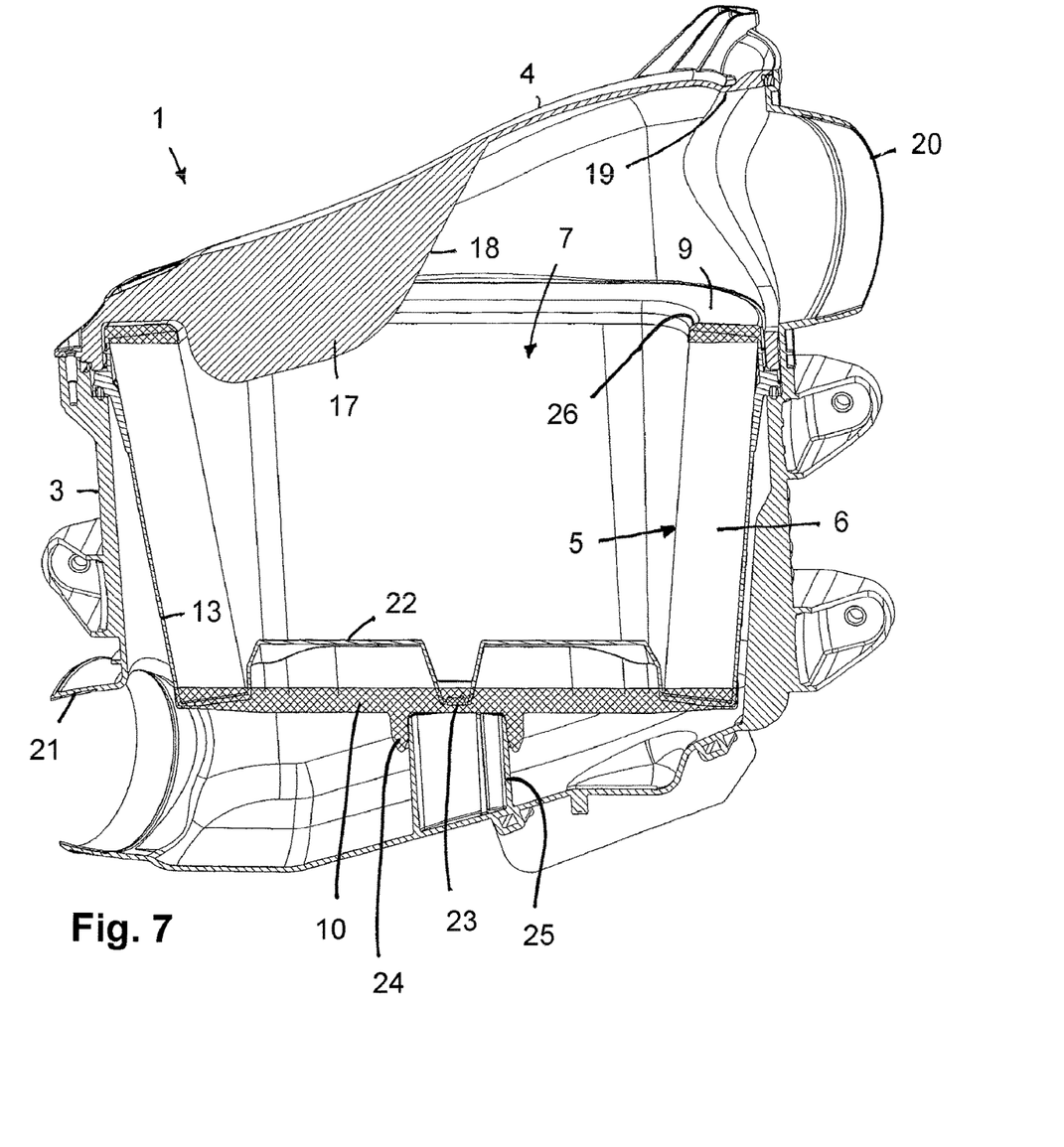
FIG. 7 shows a further section view of the filter device.

The following explanations concern the housing cover 4 which comprises at its inner side a blade-shaped flow guiding rib 17 (FIGS. 5, 6, 7). The flow guiding rib 17 is in particular embodied to be straight and positioned in a plane and extends in the mounted state, as shown in FIGS. 6 and 7, axially into the inwardly positioned flow space 7 inside the filter element 5. The flow guiding rib 17 is embodied as one piece together with the housing cover 4.

A lateral inflow opening 19 is provided in the housing cover 4 through which the raw fluid flows radially into the filter device. The inflow opening 19 in the housing cover 4 corresponds with a further inflow opening 20 provided in the filter housing base 3. When the housing cover 4 is attached, the inflow openings 19 and 20 lie on top of each other so that a continuous flow path for the raw fluid is formed. The end face 18 of the flow guiding rib 17 is facing the inflow opening 19 in the housing cover 4. The flow guiding rib 17 is in particular positioned centrally at the inner side of the housing cover 4 so that the radially supplied raw fluid is divided by the blade-shaped flow guiding rib 17 and also experiences an improved axial flow conveyance in the direction of the inwardly positioned flow space 7 inside the filter medium body 6.

Figure 2:
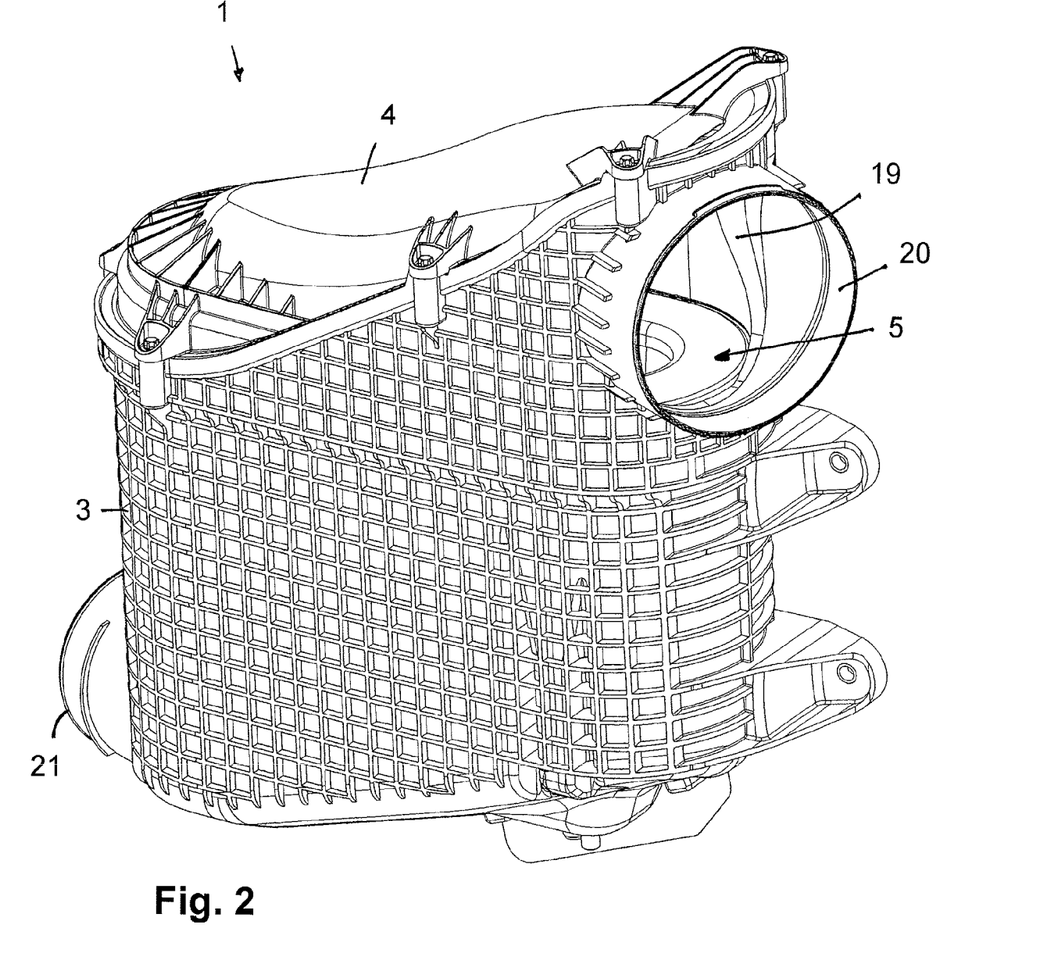
FIG. 2 shows in perspective view the filter device in mounted state.

As shown in FIGS. 1, 2, and 7, there is a lateral radial outflow opening 21 for discharging the purified fluid provided at the filter housing base 3. The longitudinal flow axes of the inflow openings 19 and 20, on the one hand, and of the discharge opening 21, on the other hand, extend at least approximately parallel. The plane of the flow guiding rib 17 can also extend approximately parallel to the longitudinal flow axes of inflow openings and outflow opening, even though also embodiments with non-parallel arrangement of the flow guiding rib 17 relative to the openings 19, 20, and 21 as well as between the inflow openings 19 and 20 and outflow opening 21 are possible.

As can be seen in FIG. 7, in the bottom region of the filter element 5, adjacent to the bottom end disk 10, a shaped body 22 is provided that is in particular formed as one piece together with the support grid 13. The shaped body 22 projects axially into the inwardly positioned flow space 7 inside the filter medium body 6 and provides for a stabilization of the filter medium body 6 which is embodied as a folded filter. The shaped body 22 tapers toward its open end face in a wedge shape and comprises in the central region a lowered support sleeve 23 that projects into the bottom end disk 10. The radially outwardly positioned sections of the shaped body 22 also project into the end disk 10 whereby a fixed connection between the shaped body 22 and the bottom end disk 10 is achieved. The shaped body 22 is at least substantially of a straight configuration and extends in longitudinal direction of the filter medium body 6. The radially outwardly positioned sections of the shaped body 22 are connected to the support grid 13 so that supporting and holding forces are absorbed by the shaped body 22 and the bottom end disk 10 is relieved.

As can be seen in FIG. 7 in connection with FIG. 4, an annular support part 24 with which the filter element 5 can be placed onto a housing-associated support sleeve 25 is integrally formed centrally on the bottom end disk 10 at the side which is axially facing away from the inwardly positioned flow space 7. The support sleeve 25 is located at the bottom of the filter housing base 3. The annular support part 24 has an elongate cross section shape.

As can be seen also in FIG. 7, the inflow openings 19 and 20 are positioned in such a way that the end face of the top end disk 9 forms a continuous contour at the same level with the inflow openings 19 and 20. The downward inner side of the inflow openings 19 and 20 is located axially at the same level as the outwardly positioned end face of the top end disk 9. In this way, an obstacle-free inflow of the raw fluid is ensured.

As can be seen in FIG. 7 in connection with FIG. 3, the top end disk 9 is provided at its radially inwardly positioned side facing the central opening with a rounded portion 26 which facilitates inflow of the raw fluid into the inwardly positioned flow space 7. The radius of the rounded portion 26 at the radial inner side of the end disk 9 is greater than at the radial outer side of the end disk 9.

What is claimed is:

1. A filter device, comprising:
a round filter element;
a filter housing comprising an interior, wherein the round filter element is received in the interior;
the round filter element comprising a filter medium body comprising
a wall configured to be flowed through in a radial direction relative to a longitudinal axis of the filter medium body by a fluid to be purified;
the round filter element further comprising
a first end disk and
a second end disk arranged at oppositely positioned end faces of the filter medium body;
the filter medium body comprising
an inwardly positioned flow space inside the filter medium body,
wherein the inwardly positioned flow space is a raw side of the round filter element;
the round filter element further comprising
a support grid arranged externally at the wall of the filter medium body;
the filter housing comprising a housing cover,
wherein the housing cover comprises a flow guiding rib arranged at an inner side of the housing cover facing the interior, and
wherein the flow guiding rib projects into the inwardly positioned flow space of the filter medium body,
wherein the housing cover comprises a lateral flow opening,
wherein the filter housing comprises a filter housing base comprising an inflow opening.

2. The filter device according to claim 1, wherein
the first end disk is an open end disk comprising
a flow opening through which the flow guiding rib protrudes.

3. The filter device according to claim 2, wherein
the filter medium body is configured to be flowed through from the inwardly positioned flow space outwardly in the radial direction.

4. The filter device according to claim 1, wherein
the lateral flow opening of the housing cover is an inflow opening that corresponds with the inflow opening of the filter housing base such that, when the housing cover is attached to the filter housing base, the inflow opening of the housing cover and the inflow opening of the filter housing base lie on top of each other.

5. The filter device according to claim 1, wherein
the flow guiding rib comprises a curvature.

6. The filter device according to claim 5, wherein
the curvature of the flow guiding rib is embodied such that
a fluid flow, radially supplied through the lateral flow opening of the housing cover, experiences a deflection in a direction toward the inwardly positioned flow space of the filter medium body.

7. A filter device, comprising:
a round filter element;
a filter housing comprising an interior, wherein the round filter element is received in the interior;
the round filter element comprising a filter medium body comprising
a wall configured to be flowed through in a radial direction relative to a longitudinal axis of the filter medium body by a fluid to be purified;
the round filter element further comprising
a first end disk and
a second end disk arranged at oppositely positioned end faces of the filter medium body;
the filter medium body comprising
an inwardly positioned flow space inside the filter medium body,
wherein the inwardly positioned flow space is a raw side of the round filter element;
the round filter element further comprising
a support grid arranged externally at the wall of the filter medium body;
the filter housing comprising a housing cover,
wherein the housing cover comprises a flow guiding rib arranged at an inner side of the housing cover facing the interior, and wherein the flow guiding rib projects into the inwardly positioned flow space of the filter medium body,
wherein the housing cover comprises a lateral flow opening,
wherein an end face of the flow guiding rib is facing the lateral flow opening of the housing cover.

8. A round filter element, comprising:
a filter medium body comprising
   a wall configured to be flowed through in a radial direction relative to a longitudinal axis of the filter medium body by a fluid to be purified;
   a first end disk and a second end disk arranged at oppositely positioned end faces of the filter medium body;
the filter medium body comprising
   an inwardly positioned flow space inside the filter medium body,
   wherein the inwardly positioned flow space is a raw side of the round filter element;
a support grid arranged externally at the wall of the filter medium body;
the round filter element configured to be received in a filter housing comprising a housing cover with a flow guiding rib arranged at an inner side of the housing cover so as to project into the inwardly positioned flow space of the filter medium body,
the round filter element further comprising:
   a seal carrier and
   a sealing element arranged at the seal carrier,
   wherein the seal carrier is arranged adjacent to the first end disk that is associated with the raw side of the round filter element,
   wherein the sealing element is positioned at an axial spacing in an axial direction and at a radial spacing in the radial direction relative to the first end disk,
wherein the seal carrier comprises
   a circumferentially extending carrier wall extending at a spacing to an externally positioned wall surface of the filter medium body,
wherein the carrier wall comprises
   a first end face, facing away from the first end disk, and
   wherein the sealing element is arranged at the first end face of the carrier wall,
wherein the first end face of the carrier wall comprises
   a receiving groove and the sealing element is arranged in the receiving groove.

9. The round filter element according to claim 8, wherein the seal carrier is arranged at the support grid.

10. The round filter element according to claim 9, wherein the seal carrier and the support grid are embodied together as one piece.

11. The round filter element according to claim 8, wherein the carrier wall comprises
   a second end face facing the first end disk,
   wherein the second end face of the carrier wall is connected seal-tightly to first end disk.

12. The round filter element according to claim 11, wherein
the second end face of the carrier wall is embedded in an end disk material of the first end disk.

13. A round filter element, comprising:
a filter medium body comprising
   a wall configured to be flowed through in a radial direction relative to a longitudinal axis of the filter medium body by a fluid to be purified;
   a first end disk and a second end disk arranged at oppositely positioned end faces of the filter medium body;
the filter medium body comprising
   an inwardly positioned flow space inside the filter medium body,
   wherein the inwardly positioned flow space is a raw side of the round filter element;
a support grid arranged externally at the wall of the filter medium body;
the round filter element configured to be received in a filter housing comprising a housing cover with a flow guiding rib arranged at an inner side of the housing cover so as to project into the inwardly positioned flow space of the filter medium body,
wherein the round filter element has a cross section shape tapering in an axial direction relative to the longitudinal axis from the first end disk toward the second end disk,
wherein the second end disk is smaller than the first end disk and comprises integrally formed support cams projecting in the radial direction outwardly.

14. The round filter element according to claim 13, wherein
the support cams do not project in the radial direction farther than the first end disk or an inner contour or an outer contour of a seal arranged in a region of the first end disk.

15. A round filter element comprising:
a filter medium body comprising
   a wall configured to be flowed through in a radial direction relative to a longitudinal axis of the filter medium body by a fluid to be purified;
   a first end disk and a second end disk arranged at oppositely positioned end faces of the filter medium body;
the filter medium body comprising
   an inwardly positioned flow space inside the filter medium body,
   wherein the inwardly positioned flow space is a raw side of the round filter element;
a support grid arranged externally at the wall of the filter medium body;
the round filter element configured to be received in a filter housing comprising a housing cover with a flow guiding rib arranged at an inner side of the housing cover so as to project into the inwardly positioned flow space of the filter medium body,
wherein the filter medium body comprises an oval or ovalized cross section shape and the second end disk comprises opposed long sides,
the round filter element further comprising support cams formed integrally at the opposed long sides of the second end disk.

* * * * *